United States Patent [19]
Ohuchi et al.

[11] Patent Number: 5,396,526
[45] Date of Patent: Mar. 7, 1995

[54] APPARATUS FOR REMOVING KEYS FROM SUPPORT GRID

[75] Inventors: Katsunori Ohuchi; Junichi Oyama; Masashi Yoshida; Taichi Koiwai; Shuji Yamazaki, all of Tohkai, Japan

[73] Assignee: Mitsubishi Nuclear Fuel Co., Tokyo, Japan

[21] Appl. No.: 139,035

[22] Filed: Oct. 21, 1993

[30] Foreign Application Priority Data

Oct. 22, 1992 [JP] Japan .................. 4-284774

[51] Int. Cl.$^6$ .......................................... G21C 19/00
[52] U.S. Cl. ..................................... 376/261; 376/446
[58] Field of Search ............. 376/261, 442, 446, 438; 29/906, 723; 976/DIG. 68

[56] References Cited

U.S. PATENT DOCUMENTS

| | | | |
|---|---|---|---|
| 3,795,040 | 3/1974 | Jabsen | 29/433 |
| 3,892,027 | 7/1975 | Jabsen | 29/200 P |
| 3,894,327 | 7/1975 | Jabsen | 29/200 R |
| 4,624,400 | 11/1986 | Zimmer | 226/188 |
| 5,068,081 | 11/1991 | Oyama et al. | |
| 5,259,010 | 11/1993 | Brown et al. | 376/446 |
| 5,274,684 | 12/1993 | Yoshida et al. | 376/261 |
| 5,289,515 | 2/1994 | Oyama et al. | 376/442 |
| 5,301,214 | 4/1994 | Kato et al. | 376/261 |
| 5,303,273 | 4/1994 | Koiwai et al. | 376/261 |
| 5,313,507 | 5/1994 | Ohuchi et al. | 376/462 |

FOREIGN PATENT DOCUMENTS 0105779 4/1984 European Pat. Off.
0196609 10/1986 European Pat. Off.

OTHER PUBLICATIONS

Patent Abstracts of Japan, vol. 14, No. 525 (P-1132), Nov. 19, 1990, JP-A-02 221 890, Sep. 4, 1990.

Primary Examiner—Donald P. Walsh
Assistant Examiner—Meena Chelliah
Attorney, Agent, or Firm—Oblon, Spivak, McClelland, Maier, & Neustadt

[57] ABSTRACT

An apparatus is presented for removing the inner and outer keys from a support grid of a fuel assembly automatically or by mechanical methods. The apparatus removes a line of keys from a loaded assembly inserted into a grid through an opening section of the grid to deflect the springs. Both ends of the keys are engaged with the engaging members, and one set of keys are rotated in one direction while the other set of keys are rotated in the opposite direction. The springs are then released to press on the fuel rods firmly in place between the springs and the dimples in the grid cell. The keys are removed from the grid by clamping or holding the keys and moving the keys together with the clamping/holding device in the key axis direction by operating the driving device until the keys are removed completely from the grid.

11 Claims, 9 Drawing Sheets

5,396,526

APPARATUS FOR REMOVING KEYS FROM SUPPORT GRID

BACKGROUND OF THE INVENTION

1. Field of the Invention

The present invention relates to an apparatus for assembling a fuel assembly and more specifically to an apparatus for mechanically or automatically removing the keys after loading the fuel rods. The keys are inserted into support grids of a fuel assembly for deflecting the springs away from the dimples prior to loading the fuel rods into the supporting grids.

2. Background Technology

In general, pressurized light water nuclear reactors utilize a type of fuel assembly comprising: an upper nozzle and a lower nozzle; a plurality of supporting grids for supporting the fuel rods (shortened to grids henceforth) disposed between the nozzles with a certain spacing; instrumentation pipes and fuel rod guide pipes inserted into and attached to the grid cells of the grids; and a plurality of fuel rods inserted into and held elastically in the grid cells with the springs formed inside the grid cells.

When assembling such a fuel assembly, there is a danger of introducing scratches on the surface of the fuel rods if the rods are inserted into the grid cells with the springs and dimples as they are, because the springs and dimples are formed on the inside walls of the grid cells. To prevent damaging the surface of the fuel rods, there have been various methods suggested to deal with the prevention of surface damage problem.

For example, a method proposed in a U.S. Pat. No. 5,068,081 proposed the following fuel assembly. In this fuel assembly, key insertion opening are formed in the grids, and the spring deflection jigs are inserted into the grid cells to deflect the springs away from the dimples formed in each wall of the grid cell for elastically holding the fuel rod. The keys are inserted through the key openings to keep the springs in the deflected position, so as to allow the fuel rods to be inserted into the grid cells smoothly without the danger of causing surface damages.

However, such key insertion and removal operations are designed to be carried out manually, thus causing an operational problem because the tasks are cumbersome, the operations is lengthy and the efficiency is low. In particular, the workers involved in the key removal operation were required to work in the proximity of the fuel rods, and were particularly vulnerable to radiation exposure. From these viewpoints, there has been a need to automate the key removal operation.

SUMMARY OF THE INVENTION

The present invention was made in view of the background described above, and the objective is to present a key removal apparatus which can carry out the task of removing the keys from a loaded assembly smoothly and reliably, and offer opportunities for mechanization and automation.

The above objective is achieved in an apparatus for removing keys from a grid of a fuel assembly having fuel rods inserted in a plurality of grid cells, formed by a plurality of straps of a thin longitudinal strip form intersecting at right angles to each other, having dimples formed on one adjacent pair of walls of said grid cells and springs formed on opposing pair of walls of said grid cells, wherein a plurality of keys which had been inserted in said grid in the longitudinal direction of said strip form through opening sections formed near the intersections of said plurality of straps are removed by said apparatus comprising; at least one key rotation means, which rotates one set of said plurality of keys in one rotational direction about the key axis, and the other set of said plurality of keys in the opposite rotational direction; and at least one key moving means, for moving said plurality of keys in the direction of the key axis.

Accordingly, when the keys are used to deflect the springs away from the dimples in a grid having the springs and the dimples disposed rotationally symmetrically in four quadrants of the grid cells, the plurality of keys in any one line of grid cells are disposed so that the keys are oriented symmetrically with respect to each of the two diametrical lines passing through the center O of the grid. Therefore, the apparatus of the present invention enables a set of keys to be rotated in the relative opposite directions depending on the location of the keys in the line of keys. By so doing, all the keys in one line of keys can be disengaged from the grid, and the line of keys are removed from the cells by pulling them out of the grid cells by the key moving devices. The apparatus thus enables the keys to be removed completely from the grid, and allows mechanization and automation of the key removal operation.

PREFERRED EMBODIMENTS OF THE INVENTION

Prior to insertion of the fuel rods into the grid cells, a plurality of inner keys are used to deflect the springs from the dimples formed in the gird cells. The key removal apparatus is used to remove the inner keys from the opening sections of the grids after the fuel rods have been inserted into the girds. The key removal apparatus can be used singly or in a multiple set to hold the grids of the fuel assembly. The key removal apparatus is brought to the fully loaded assembly containing a plurality of grids and the key removal apparatus is fitted to the grids through the opening section of a U-shaped receptor of the key removal apparatus. Once the grids are properly seated in the receptor, the closure member is put in place to hold the grids firmly in place. The rest of the removal steps are carried out while firmly holding the grid or grids in the U-shaped receptor.

In the following, various embodiments of the present invention will be explained with reference to FIGS. 1 to 12. FIGS. 1 to 6 show the first embodiment, and FIGS. 9 to 12 show a second embodiment of the key removal apparatus.

Figure 7:
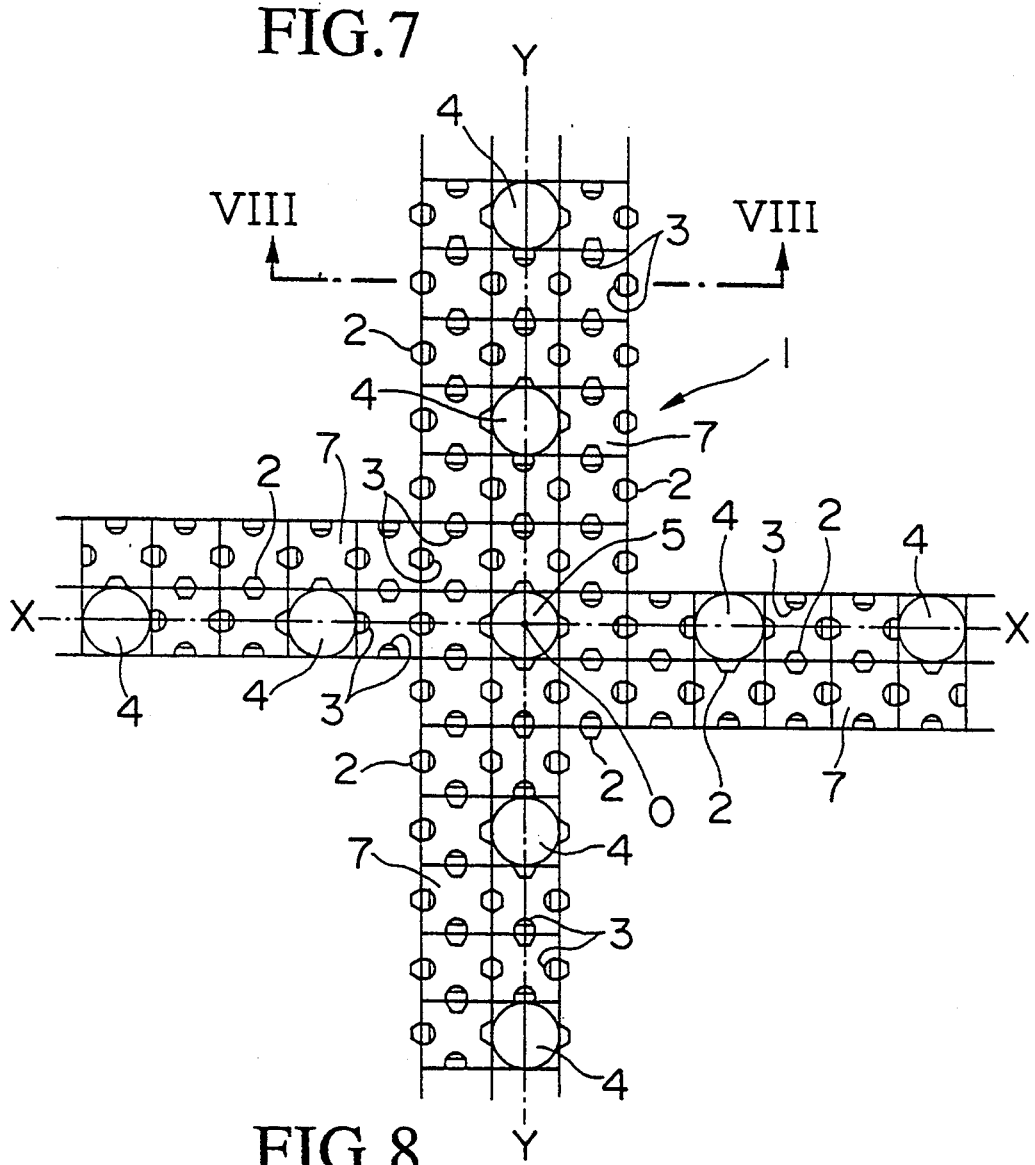
FIG. 7 is a partial plan view of the grid to explain the central section of the grid.
Figure 8:
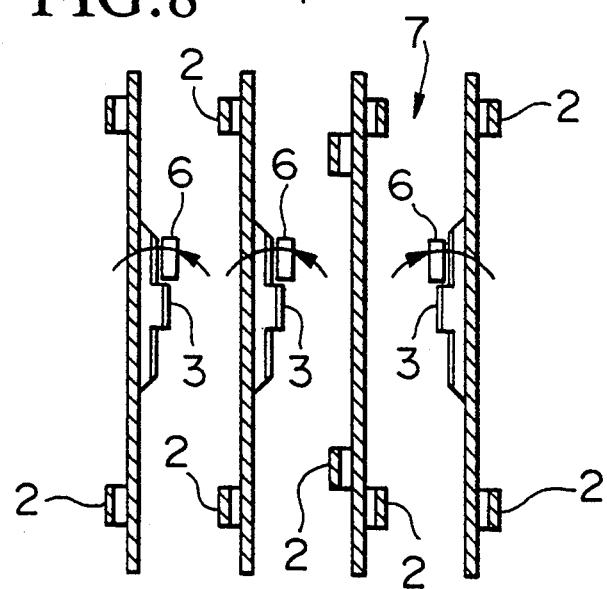
FIG. 8 is a partial cross sectional view at the line VIII—VIII in FIG. 7.

FIGS. 7 and 8 show the arrangement of the dimples 2 and springs 3 formed in grids cells 7 in certain limited regions of the gird 1. As shown in FIG. 7, the arrangement is symmetrical with respect to an axis at right angles to the paper passing through the center O formed by the intersection of a line X—X and a line Y—Y. The dimples 2 and the springs 3 are disposed so that they are symmetrical in each of the four quadrants. In FIG. 7, the reference numerals 4 and 5 designate grid cells 7 for housing control rod guide pipe and instrumentation pipes, respectively. In FIG. 8, the reference numeral 6 designates an inner key.

As shown in FIGS. 1 to 6, the key removal apparatus comprises: a main post member 10 having a U-shaped receptor 10a which houses a grid 1; a closure member 13 which closes the opening section of the U-shaped receptor 10a; a press-down member 14 provided on the main posts 10 and the closure members 13, for holding down the grid 1 in the receptor 10a; a fluidic cylinder 15 for operating the press-down member 14 towards and away from the grid 1; four key rotation devices 20 which rotates the plurality of inner keys 6 inserted through the opening section of the grid 1 about their key axis; two key moving devices 30 which moves the plurality of inner keys 6 inserted in the grid 1 along the key axis. The closure member 13 is attached to the main post 10 through a support axis 11, shown in FIG. 3, and closes or opens the opening section in the direction of the arrow shown in FIG. 3 by ascending or descending along the support axis 11 as well as by rotating around the support axis 11. The grid 1 is held firmly in place by means of the fastener 12.

Figure 2:
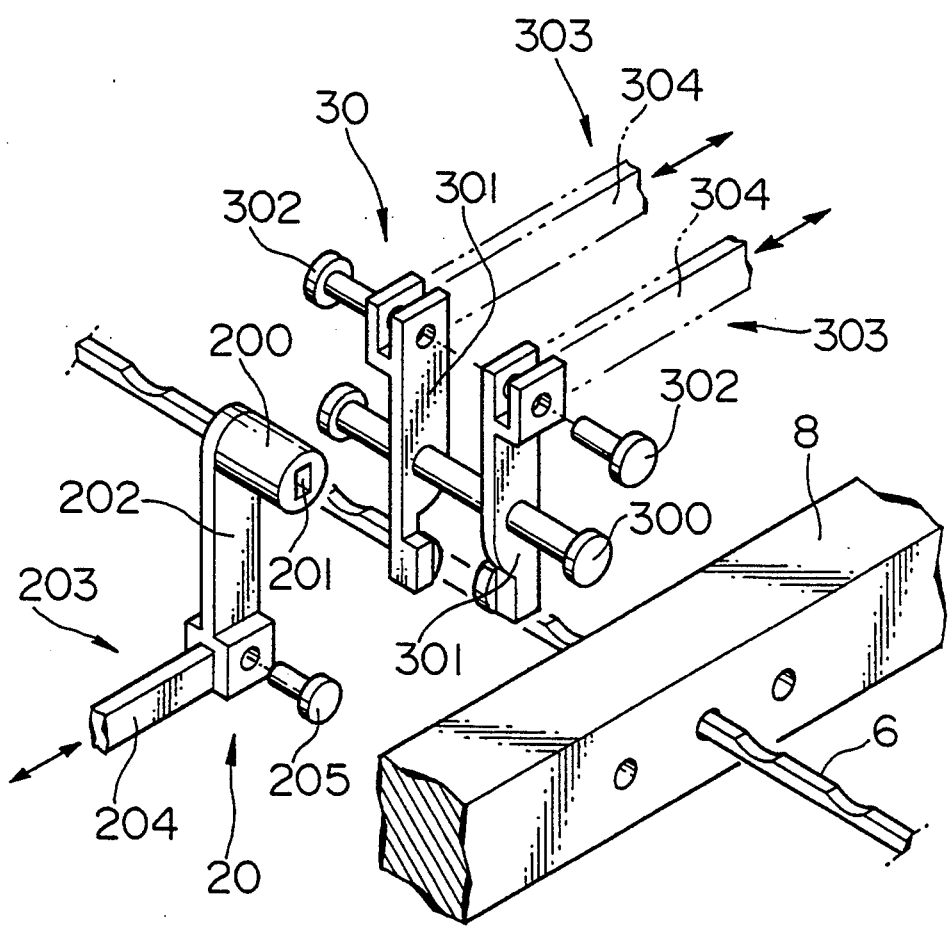
FIG. 2 is an exploded view of the main sections of the apparatus shown in FIG. 1.

The reference numeral 8 refers to an outer key which are used to deflect the outermost springs 3 from the dimples 2 formed on the outer straps which form the grid cells 7 (refer to FIG. 2). It is mentioned here again that the key removal apparatus is used after the grids 1 have been loaded with the plurality of fuel rods, and the inner keys 6 have been inserted into the girds cells 7 through the opening section at right angles to the fuel rods.

The four key rotation devices 20 are movably provided at the three edges of the main post 10 as well as for the closure member 13, and the key rotation devices 20 are disposed on the moving blocks 16 so as to move towards or away from the grid 1 which is housed in the receptor 10a. In other words, there are many (16 pieces) engaging members 200 rotatably provided on the moving blocks 16, and each engaging member 200 is formed with a rectangular-shaped through hole 201 for fittingly engaging an inner key 6 therein.

Figure 5:
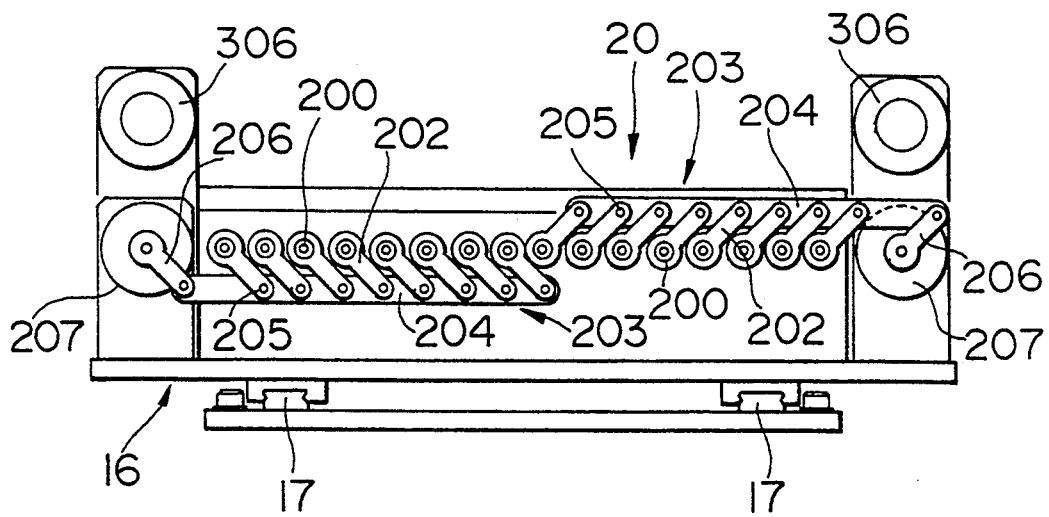
FIG. 5 is an illustration to explain the key rotation device of the first embodiment.

In FIG. 5, it is shown that each arm member 202 extending from the engaging member 200 is engaged with a connecting plate 204 of a link member 203 through a pin 205. The end of the connecting plate 204 is rotatably connected to a rotation member 206 provided with a rotation device 207. Each of the rotation devices 207, consisting of a set of eight engaging members 200, is rotated in opposite directions. This is because the dimples 2 and the springs 3, as explained earlier with reference to FIGS. 7 and 8, are arranged in four quadrants, symmetrically with respect to the lines X—X and Y—Y intersecting at the point O.

Figure 6:
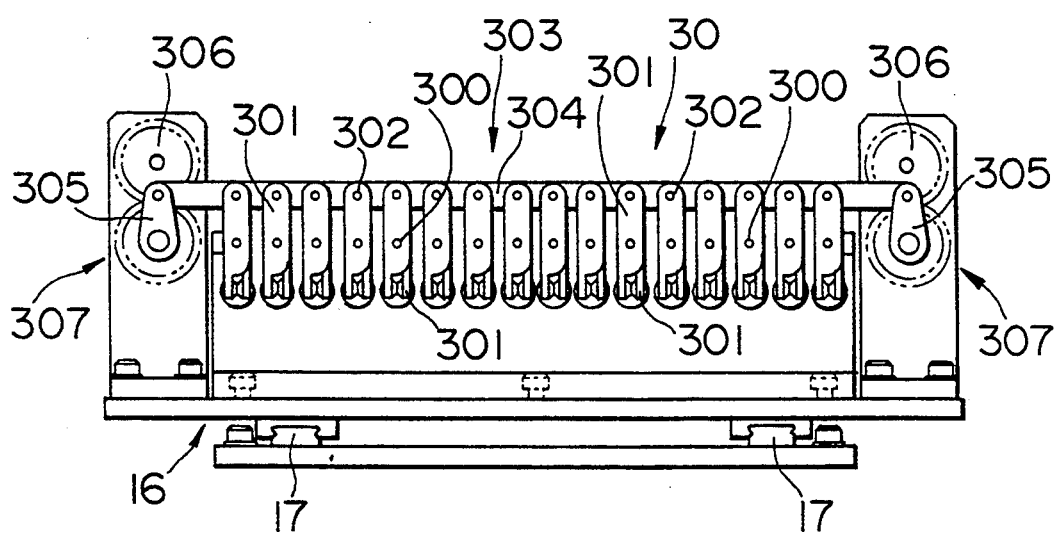
FIG. 6 is an illustration to explain the key moving device of the first embodiment.

FIG. 6 shows the key moving device 30 viewed in the direction of key which is clamped between a pair of clamping members 301. The moving block 16 slides on a pair of slide rails 17.

Figure 1:
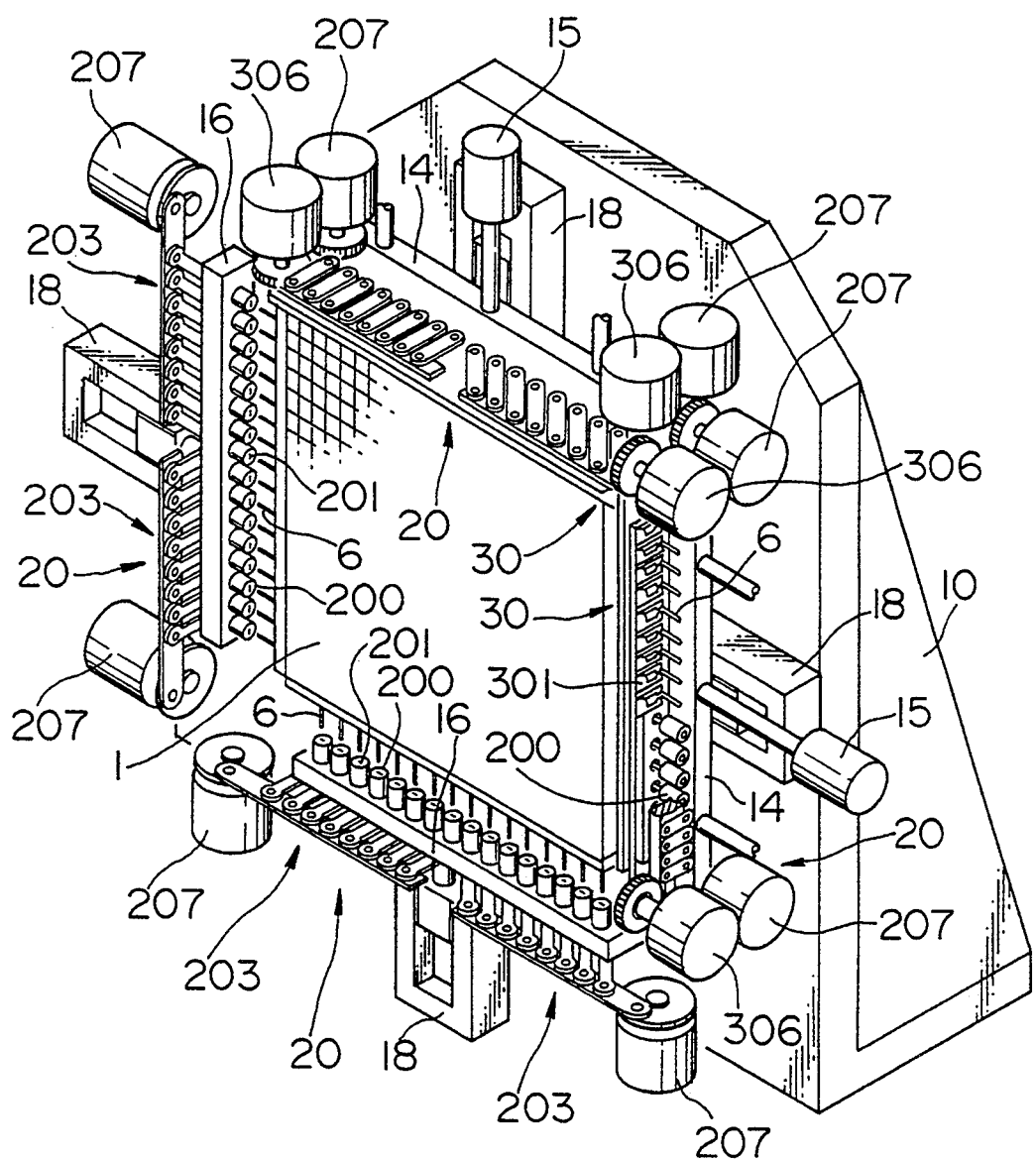
FIG. 1 is a perspective view of a first embodiment of the key removal apparatus of the present invention.
Figure 3:
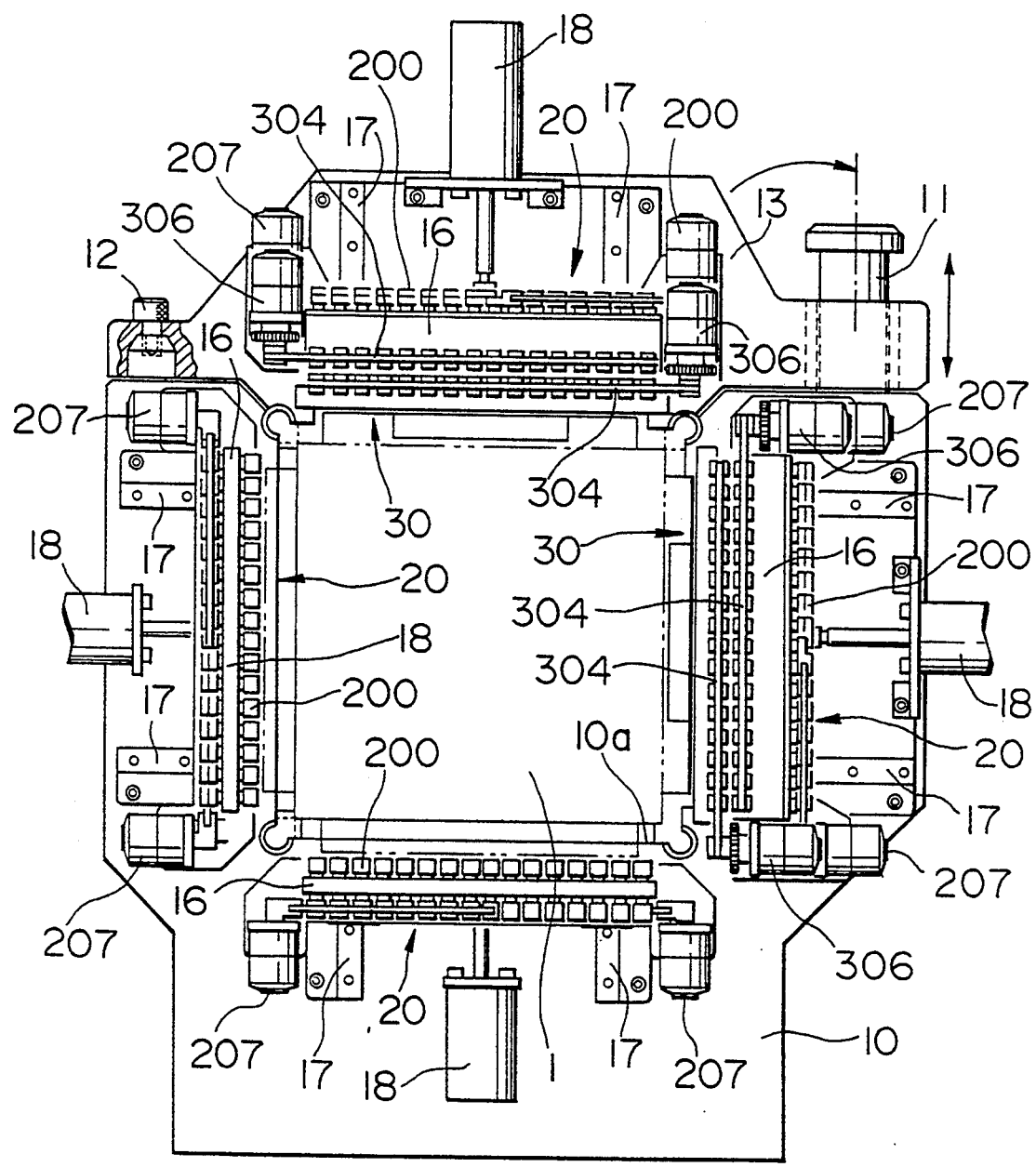
FIG. 3 is a front view of the key removal apparatus shown in FIG. 1.
Figure 4:
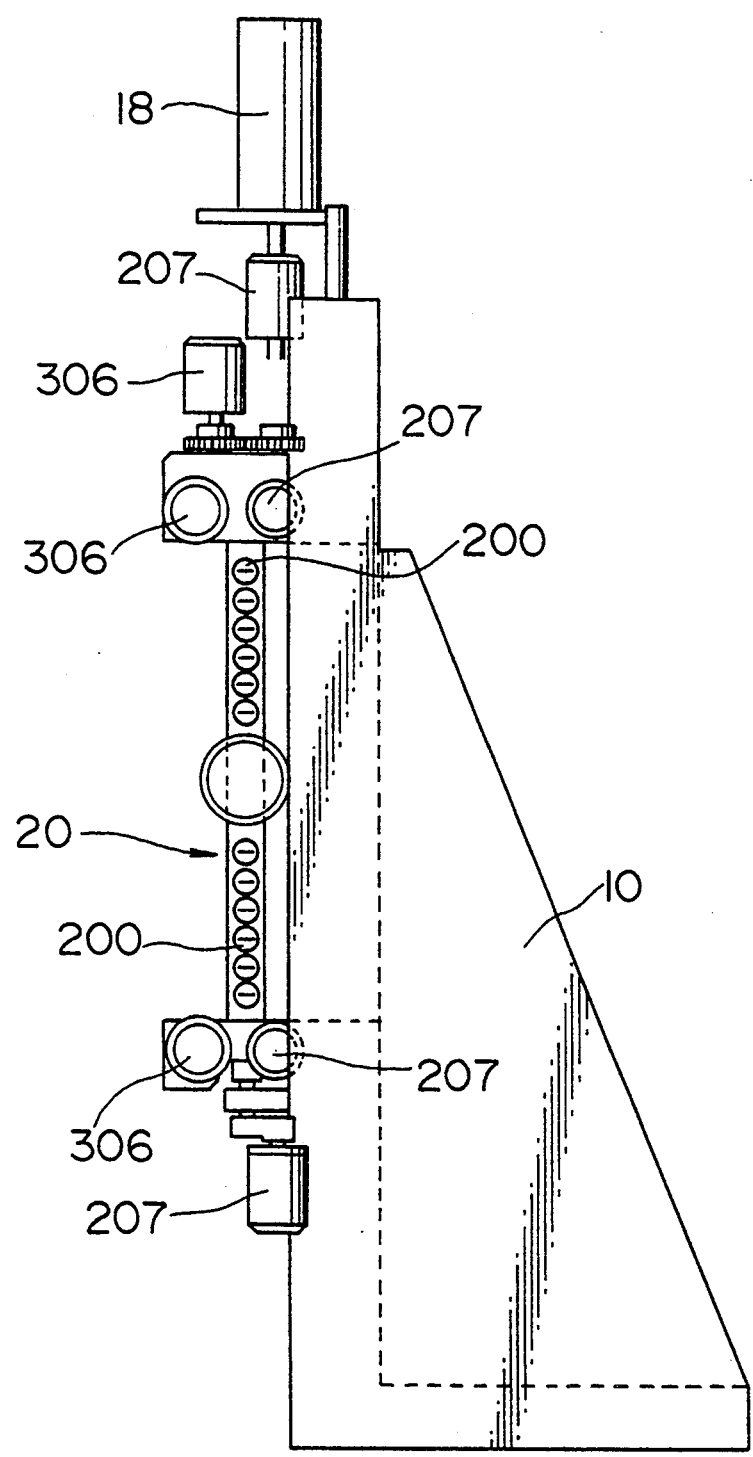
FIG. 4 is a side view of the key removal apparatus shown in FIG. 3.

As shown in FIGS. 1 and 3, the moving block 16 is connected to the driving device 18, such as a fluidic cylinder or motor, to move the moving block 16 along the slide rails 17 towards or away from the grid 1.

The two key moving devices 30 mentioned above are disposed as a paired set on one edge of the main post 10 and on the adjacent closure member 13 (in FIG. 3, right edge and the top edge). As shown in FIGS. 2 and 6, the key moving device 30 comprises: sixteen pairs of clamping members 301 disposed on each moving block 16, each pair being connected to the moving block 16 via a support axis 300 so as to be openable or closable; a pair of connecting plates 304 of the link member 303 rotatably connected to the clamping members 301 through connecting pins 302; a rotation member 305 rotatably connected to the connecting plates 304; a closing/opening motor 306 connected to the rotation member 305 through a transmission device 307; and a driving device 18 which moves the driving block 16 along the slide rails 17.

The key removal apparatus of the first embodiment as constructed above performs the following key removal operation. Before the apparatus is installed on the grid 1, the closure member 13 is rotated about the support axis 11 to swing the closure member 13 away from the opening section of the main post 10. Each of the moving block 16 is separated from the U-shaped receptor 10a by moving it along the slide rails 17 by operating the driving device 18. In this condition, the grids 1 loaded with the fuel rods and having the inner keys 6 and outer keys 8 inserted in the grids 1 is placed in the U-shaped receptor 10a of the main post 10. The closure member 13 is rotated about the support axis 11, and after closing the opening section of the main post 10 by moving the closure member 13 along the support axis 11, the closure member 13 is fixed in place with a fastener 12.

At this time, each moving block 16 is moved closer to the grid 1 housed in the U-shaped receptor 10a by moving them along the slide rails 17 by operating the driving device 18. In this condition, each end part of the inner keys 6 which had been inserted into the grids 1 are positioned between the pair of clamping members 301 of the key moving device 30. Then, both end portions of the inner keys 6 are inserted into the respective rectangular through hole 201 of the engaging members 200 of the opposing pairs of the key rotation device 20.

At this time, the rotation device 207 which are provided as a pair on each moving block 16 are operated, and each set of eight engaging members 200 is rotated respectively in opposite direction. As a result, each of the inner keys 6 which is engaged in the rectangular through hole 201 of the engaging member 200 is rotated through 90 degrees, through the same angle as the engaging member 200. By so doing, the protrusion sections of the inner keys 6, which had been holding the spring 3 away from the fuel rod surface, are disengaged from the spring 3, thus allowing the spring 3 to extend by its own elasticity force toward the dimple 2 to touch the fuel rod, and thereby holding the fuel rod in place.

This process may occur simultaneously in all the grid cells 7 of a plurality of grids 1 when a multiple of grids are being processed.

In the next phase of the key removal operation, the closing/opening motor 306 is operated, and the ends of the inner keys 6 are clamped with the pair of clamping members 301 by rotating the clamping members 301 about the support axis 300. In this condition, the driving device 18 is operated to separate the moving block 16 away from the grids 1, then the inner keys 16 clamped by the clamping device 301 move along with the clamping device 301 for a distance equal to the stroke distance, governed by the fluidic cylinder, of the driving device 18.

Next, the closing/opening motor 306 is operated so as to open the pairs of clamping members 301 by rotating them about the support axis 300, thereby releasing the ends of the inner keys 6 from the clamping force of the clamping members 301. By operating the driving device 18 and moving the moving block 16 closer to the grids 1 along the slide rails 17.

The clamping members 301 are again closed on the inner keys 6, and the inner keys 6 with the clamping device are moved as described above. By repeating the above process, each inner keys 6 is moved a distance at a time, and eventually removed completely from the grids 1.

It is also possible to remove the inner keys 6 by using a key removing apparatus presented in a second embodiment shown in FIGS. 9 to 12.

In this apparatus, the key rotation device 20 and the key moving device 30 are replaced with the key rotating device 40 and the key mover device 50, and the fluidic cylinder 15 to drive the press-down member 14 are replaced with a press-down bolt 60. Wherever the structures in the second embodiment are the same as those in the first embodiment, they are given the same reference numbers, and their explanations are omitted.

The key rotating devices 40 are provided on each of the four moving blocks 16. The key rotating device 40 comprises: a plurality of engagement members 400 each having a rectangular-shaped through hole; timing pulleys 401 disposed on the outer periphery of each of the engagement members 400; a pair of endless belts 402 each of which is installed on a set of eight timing pulleys; a set of unidirectional clutches 403a, 403b engaged with each of the endless belts 402. Furthermore, the four sets of unidirectional clutches 403a, 403b are provided on each end of the two driving shafts 404 disposed at right angles to each other. Each of the two driving shafts 404 is connected to a rotation motor 405 (only one is shown in FIG. 9).

The set of unidirectional clutches 403a, 403b engaged with the two driving shafts 404 is made so that one belt 402 is rotated in one direction, and the other belt 402 is rotated in the opposite direction for one rotational direction of the driving shafts 404 which can rotate in either clockwise or counter clockwise directions. Also the driving shaft 404 and the unidirectional clutch 403a, 403b are splined so that when the moving block 16 moves along the slide rails 17, the unidirectional clutches 403a, 403b are also able to slide along the driving shaft 404.

Figure 9:
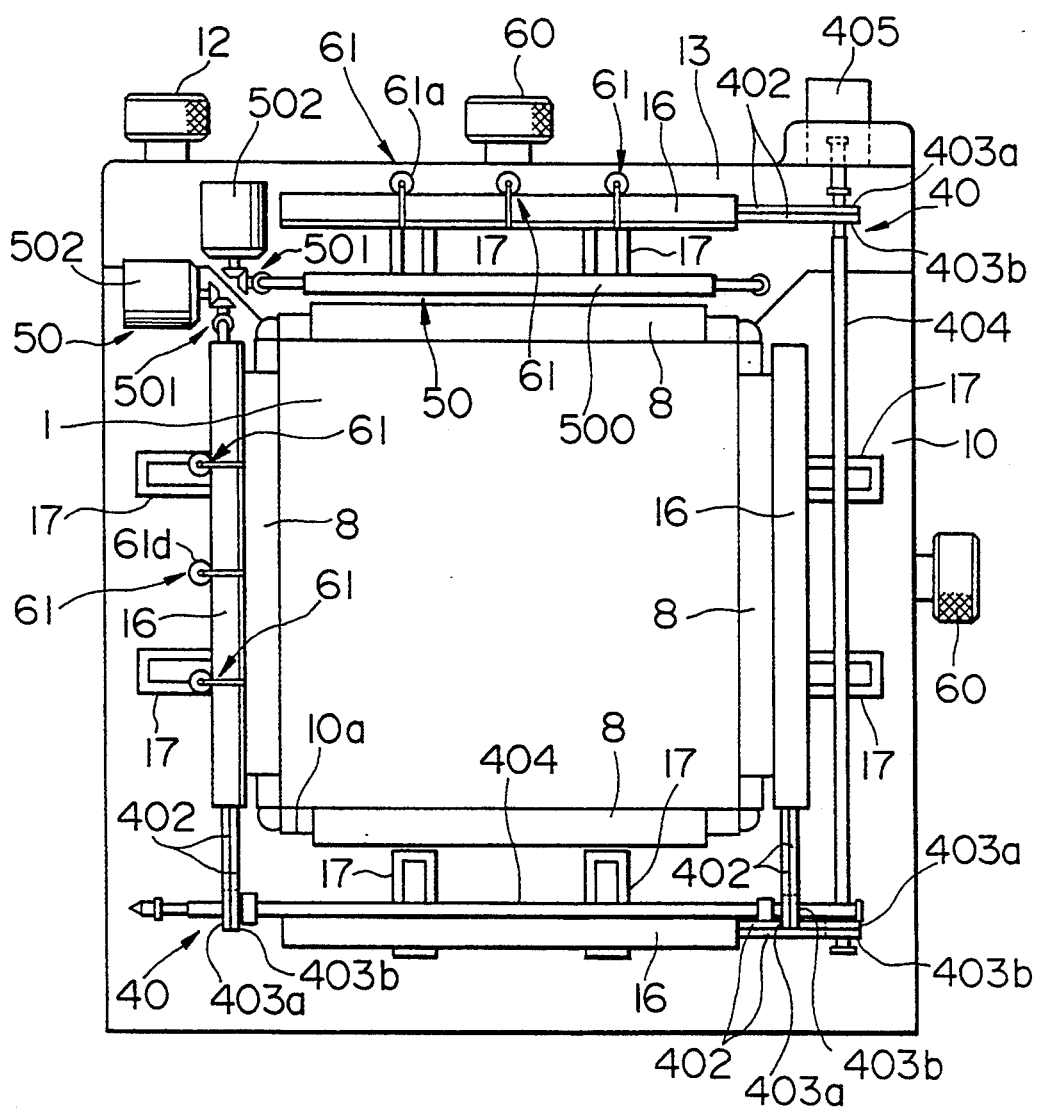
FIG. 9 is a front view of the key removal apparatus of a second embodiment of the present invention.
Figure 10:
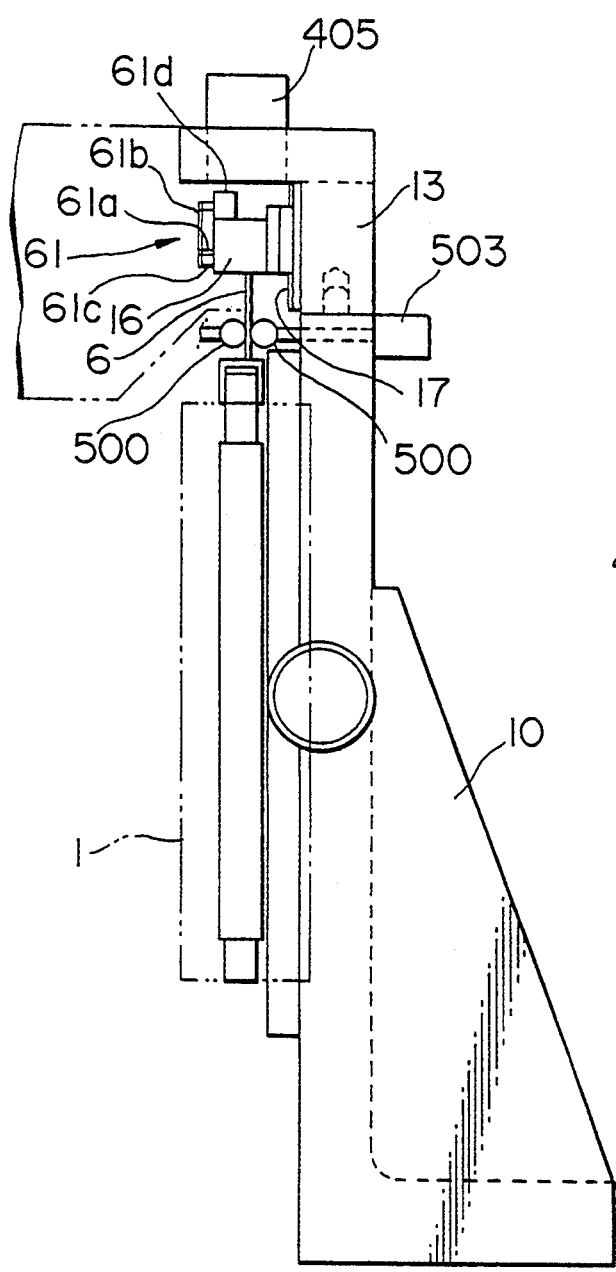
FIG. 10 is a side view of the key removal apparatus shown in FIG. 9.
Figure 11:
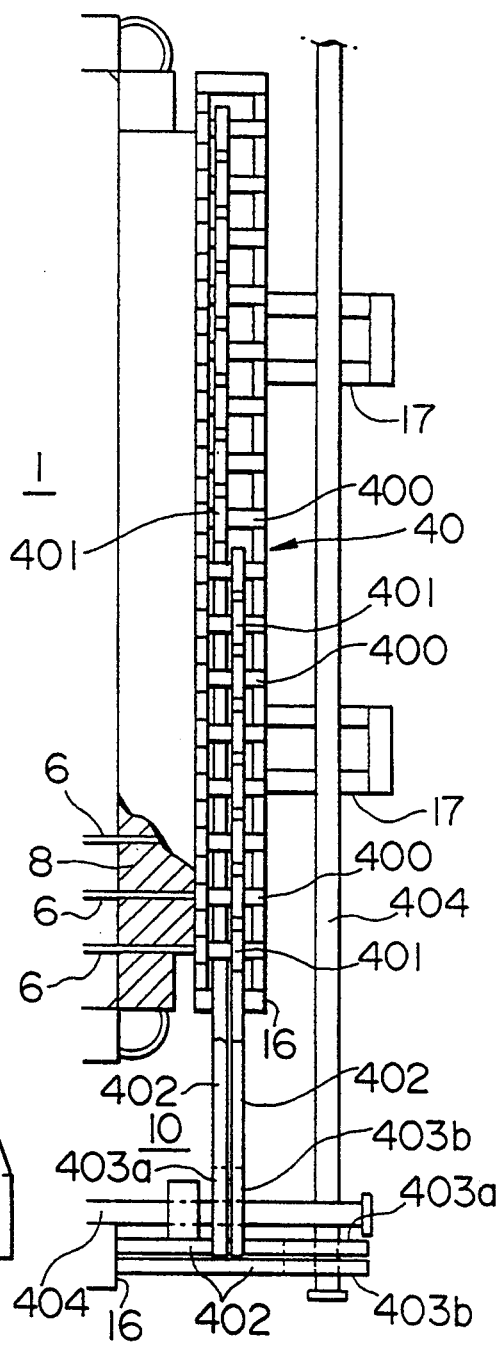
FIG. 11 is a front view showing a right side of the key removal apparatus shown in FIG. 9.
Figure 12:
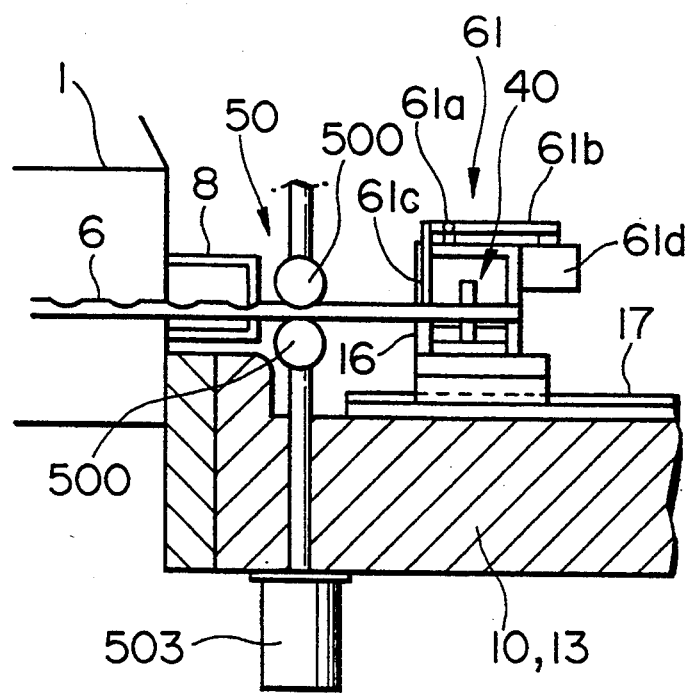
FIG. 12 is a cross sectional view of the main sections of the key removal apparatus shown in FIG. 9.

Further, an engaging device 61 for engaging the inner keys 6 is provided respectively on the moving block 16 disposed on the closure member 13 and on the moving block 16 disposed on the edge of the main post 10 adjacent to the closure member 13 (the left and top edges in FIG. 9). As shown in FIGS. 10 and 12, this engaging device 61 comprises: a support rod 61b which rotates about a support point 61a; a press-down jig 61c disposed on the tip of the support rod 61b and presses down on the inner key 6; and an engaging cylinder 61d disposed on the base of the support rod 61b for rotating the support rod 61b.

The key mover device 50 is provided to correspond with each of the engaging device 61, and comprises: a pair of revolving rollers 500 which clamp the inner key 6; a rotation motor 502 connected to the revolving roller 500 through a transmission jig 501 for rotating the revolving roller 500; and a reciprocating cylinder 503 for rotatably supporting the revolving roller 500 and for moving the revolving roller 500 towards or away from the inner key 6.

The key removing apparatus of the second embodiment constructed as above performs the same function as the key removing apparatus presented in the first embodiment. The grid 1 is fixed in the U-shaped receptor 10a of the main post 10, and the driving device is activated to move the moving block 16 along the slide rails 17 closer to the grid 1. Both ends of the inner keys 6 inserted in the grid 1 are inserted into the rectangular through holes formed on the engagement members 400 of the key rotating device 40.

The operation of the second embodiment will be explained separately for the pair of driving shafts 404 driven by the associated pair of rotation motors 405 (only one in shown in FIG. 9). For example, in one group, there is one rotation motor 405, which transmits the rotation force through a unidirectional clutch 403a disposed on the end of the driving shaft 404, to operate a set of eight engagement members 400. When the rotation motor 405 is rotated in a clockwise direction, a clutch 403a associated with an endless belt 402 and eight timing pulleys 401 and eight engagement members 400 are rotated in the clockwise direction. As a result, the eight inner keys 6 which are inserted into the rectangular through holes on one set of the engagement members 400 are also rotated as a set in the clockwise direction through 90 degrees.

The other rotation motor 405 is operated next, and the other driving shaft 404 is rotated in the counter clockwise (c/c) direction. The rotational force is transmitted to the other unidirectional clutch 403b to rotate the endless belt 402 and the timing pulleys 401 to rotate the remaining eight engagement members 400 in the c/c direction. As a result, the remaining eight inner keys 6 engaged in the rectangular through holes of the engagement members 400 are also rotated in the c/c direction through 90 degrees.

As described above, by rotating the axis of each of the two rotation motors 405 through 90 degrees in clockwise and counter clockwise directions through 90 degrees, the inner keys 6 are disengaged from the springs 3 in the grid 1. By so doing, the spring 3 extend out by its own elasticity force towards the dimple 2, thereby firmly holding the fuel rod between the spring 2 and the dimple 3 in the grid cells 7.

Next, the engaging cylinder 61d of the engaging device 61 are operated to rotate the support rod 61b about the support point 61a, the press-down jig 61c is made to press on each of the inner keys 6. The moving block 16 having the engaging device 61 is moved away from the grid 1. The inner keys 6 attached to the press-down jigs 61c are also moved away from the grid 1 along with the movement of the moving block 16. The distance moved is governed by the stroke of the driving device 18.

Next, the engaging cylinder 61d of the engaging device 61 is operated to disengage the press-down jig 61c from the inner keys 6, then while clamping the end of each of the inner keys 6 with the rotating rollers 500 by operating the reciprocating cylinder 503, the rotation motor 502 is rotated to rotate the revolving rollers 500 until the inner keys 6 are completely removed from the grid 1.

Each of the above embodiments was based on a combination of the key rotation device 20 with the key moving device 30, and a combination of the key rotating device 40 and the key mover device 50. However, it is clear that other key removal apparatuses of similar performance may be provided by combining the key rotating device 40 with the key moving device 30 or by combining the key rotation device 20 with the key mover device 50.

What is claimed is:

1. An apparatus for removing a plurality of keys from a grid of a fuel assembly after inserting fuel rods in said grid, which is formed by a plurality of straps of a thin longitudinal strip form intersecting at right angles to each other to form a plurality of grid cells, and having dimples formed on one adjacent pair of walls of said grid cells and springs formed on opposing pair of walls of said grid cells, said grid having an arrangement of said dimples and springs which are rotationally symmetrical in four quadrants in a whole plan view, wherein said keys are inserted in said grid in a longitudinal direction of said straps through opening sections formed near intersections of said plurality of straps, said apparatus comprising:
   (a) at least one key rotation means, which rotates one half set of said plurality of keys in one rotational direction about a key axis, and the other half set of said plurality of keys in an opposite rotational direction; and
   (b) at least one key moving means, for moving said plurality of keys in the direction of the key axis.

2. An apparatus as claimed in claim 1, wherein said key rotation means is a key rotation device comprising: a plurality of engaging members for engaging with ends of said keys; link members at right angles to said key axis operatively connected to said engaging members; and rotation devices for operating said link members to rotate said engaging members; and said key moving means is a key moving device comprising: a plurality of pairs of openable or closable clamping members for clamping said keys; link members disposed on said clamping members at right angles to the key axis; closing/opening devices for opening or closing said clamping members by operating said link members; and driving devices for moving said clamping members in the direction of the key axis.

3. An apparatus as claimed in claim 1, wherein said key rotation means is a key rotating device comprising: a plurality of engagement members for engaging with ends of said keys; at least one belt means engaging with said engaging members; and rotating motor means for operating said belt means to rotate said engaging members; and said key moving means comprises: a plurality of pairs of openable or closable clamping members for clamping said keys; link members disposed on said clamping members at right angles to the key axis; closing/opening devices for opening or closing said clamping members by operating said link members; and driving devices for moving said clamping members in the direction of the key axis.

4. An apparatus as claimed in claim 3, wherein said key rotating device comprises: two of said belt means for engaging with a set of eight of said engaging members and with a remaining set of eight of said engaging members; two unidirectional clutches, one of said unidirectional clutches having a clockwise rotational direction and the other one of said unidirectional clutches having a counter clockwise rotational direction for engaging with each of said belt means; a driving shaft attached to said two unidirectional clutches; and said rotating motor means for operating said driving shaft in clockwise and counter clockwise directions.

5. An apparatus as claimed in claim 1, wherein said key rotating device comprises: a plurality of engagement members for engaging with ends of said keys; at least one belt means engaged with said engaging members; rotating motor means for operating said belt members to rotate said engaging members; and said key moving means is a key mover device comprising: a pair of revolving rollers disposed opposite to and at right angles to the key axis so as to clamp said keys and move said keys in the key axis direction; and reciprocating cylinder means for moving said revolving rollers toward each other or away from each other.

6. An apparatus as claimed in claim 5, wherein said key rotating device comprises: two of said belt means for engaging with a set of eight of said engaging members and with a remaining set of eight of said engaging members; two unidirectional clutches, one of said unidirectional clutches having a clockwise rotational direction and the other one of said unidirectional clutches having a counter clockwise rotational direction for engaging with each of said belt means; a driving shaft attached to said two unidirectional clutches; and said rotating motor means for operating said driving shaft in clockwise and counter clockwise directions.

7. An apparatus as claimed in claim 1, wherein said key rotation device comprises: a plurality of engaging members for engaging with ends of said keys; link members disposed at right angles to said key axis operatively connected to said engaging members; and rotation devices for operating said link members to rotate said engaging members; and said key mover device comprises a pair of revolving rollers disposed opposite to and at right angles to the key axis so as to clamp said keys and move said keys in the key axis direction; and reciprocating cylinder means for moving said revolving rollers toward each other or away from each other.

8. An apparatus as claimed in claim 1, wherein said apparatus comprises: a main post having a U-shaped receptor for holding said grid; and a closure member for firmly holding said grid in said U-shaped receptor; wherein said key rotation means is disposed on each of moving blocks provided on four edges defined by three edges of the main post and one edge of the closure member and said key moving means is disposed on each of moving blocks disposed adjacent to two edges of said four edges.

9. An apparatus as claimed in claim 1, wherein said apparatus comprises: a main post having a U-shaped receptor for holding said grid; and a closure member for firmly holding said grid in said U-shaped receptor; wherein said key rotation means is disposed on each of moving blocks provided on four edges defined by three edges of the main post and one edge of the closure member.

10. An apparatus as claimed in claim 5, wherein said key mover device is provided with an engaging device which pulls out inner keys of said plurality of keys by engaging with one end of said inner keys and moving together with said moving block for a specific distance.

11. An apparatus as claimed in claim 7, wherein said key mover device is provided with an engaging device which pulls out inner keys of said plurality of keys by engaging with one end of said inner keys and moving together with said moving block for a specific distance.

* * * * *